No. 751,707. PATENTED FEB. 9, 1904.
L. ZAMBONI.
PULLEY OR WHEEL.
APPLICATION FILED SEPT. 30, 1903.
NO MODEL

Lawrence Zamboni
Inventor
By Dickerson, Brown, Raegener
His Attorneys

No. 751,707.

Patented February 9, 1904.

UNITED STATES PATENT OFFICE.

LAWRENCE ZAMBONI, OF NEW YORK, N. Y.

PULLEY OR WHEEL.

SPECIFICATION forming part of Letters Patent No. 751,707, dated February 9, 1904.

Application filed September 30, 1903. Serial No. 175,113. (No model.)

*To all whom it may concern:*

Be it known that I, LAWRENCE ZAMBONI, a citizen of the United States, and a resident of the borough of Manhattan, city, county, and State of New York, have invented certain new and useful Improvements in Pulleys or Wheels, of which the following is a specification, accompanied by drawings.

This invention relates to pulleys or wheels of sheet metal; and the objects of the invention are to enable such pulleys or wheels to be made in a simple and economical manner, to improve upon their construction and efficiency, and increase their strength with simplicity of parts.

Further objects of the invention will hereinafter appear; and to these ends the invention consists of a pulley or wheel as a new article of manufacture for carrying out the above objects embodying the features of construction, combinations of elements, and arrangements of parts substantially as hereinafter fully described and claimed in this specification and shown in the accompanying drawings, in which—

Figure 1:
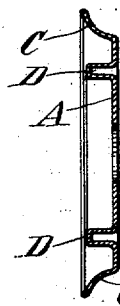
Figures 2, 3:
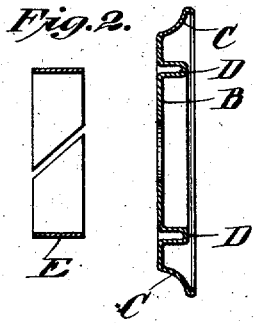
Figure 4:
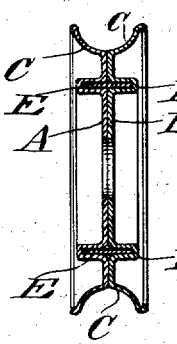
Figure 5:
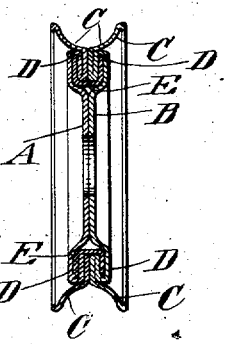
Figure 6:
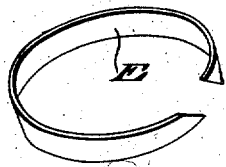
Figure 7:
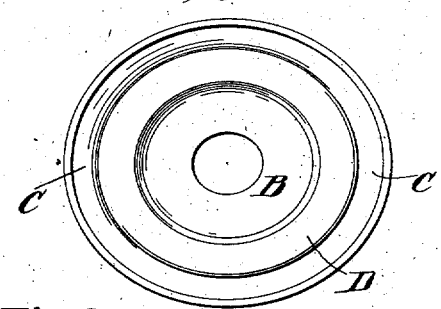
Figure 8:
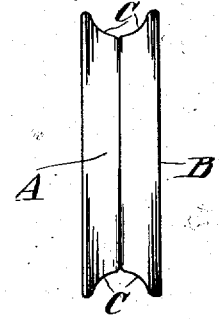

Figure 1 is a vertical sectional view of one of the members of a wheel or pulley. Fig. 2 is a sectional view of a locking-piece. Fig. 3 is a vertical sectional view of the other member of the pulley or wheel. Fig. 4 is a vertical sectional view of the two wheel members arranged in coöperative relation to one another, with the locking device in position prior to the bending operation, which locks the two members together. Fig. 5 is a vertical sectional view of the finished wheel or pulley. Fig. 6 is a perspective view of a locking device. Fig. 7 is a side view of a finished wheel or pulley. Fig. 8 is an edge view of the same.

The parts of the wheel or pulley may be stamped cold out of sheet metal, and they are then locked together, so that no rivets are necessary.

Referring to the drawings, A and B represent the two parts or members of a wheel or pulley which coöperate one with the other to form the complete structure. The members A and B are provided with coöperating flaring flanges C, which in the drawings are shown coöperating to form a grooved pulley or wheel, although they may take other forms when a wheel with a flat rim is desired. The body portions of the members A and B are formed with an opposed groove D for the reception of the locking device E, which consists in this instance of a split spring-ring. As shown in Fig. 4, the locking device E extends into the opposed groove D when the parts are assembled, and then the grooves and the locking device are bent, as shown in Fig. 5, to lock the parts together. Preferably the grooves D, which are shown in this instance between the flanges C and the center of the wheel, are arranged at such distances from the flanges that when the bending operation has been completed the groove will bear upon the bases of the flanges, as shown in Fig. 5, and lie flat against the sides of the wheel. This construction adds strength and rigidity to the periphery of the wheel and forms a brace for the flanges. The locking device E takes the U-shaped form shown in Fig. 5 after the locking operation and effectually locks the parts together.

The wheel members A and B may be formed in any suitable manner by suitable tools and dies, and the bending operation for locking the parts together may be effected in any suitable manner by suitable tools.

Obviously some features of this invention may be used without others, and the invention may be embodied in widely-varying forms.

Therefore without limiting the invention to the construction shown and described nor enumerating equivalents, I claim, and desire to secure by Letters Patents, the following:

1. As a new article of manufacture, a wheel formed of two members having outwardly-flaring flanges forming the rim of the same, and coöperating grooves formed in said members separate from the flanges, with a locking-piece in said grooves, the grooved portions and the locking-piece being bent to lock the parts together, substantially for the purposes set forth.

2. As a new article of manufacture, a wheel formed of two members having coöperating flanges forming a periphery of the same, and opposed grooves in the body portions of said members between said flanges and the center of the wheel, with a locking-strip extending into said grooves, the grooved portions and the locking-strip being bent to lock the two wheel members together, substantially for the purposes set forth.

3. As a new article of manufacture a wheel formed of two members having coöperating flanges forming the periphery of the same, and opposed grooves in the body portions of said members between said flanges and the center of the wheel, with a locking-strip extending into said grooves, the grooved portions and the locking-strip being bent outwardly against the bases of the said flanges and flat against the body portions of the wheel to lock the members together, substantially for the purposes set forth.

4. As a new article of manufacture, a wheel formed of two members having outwardly-flaring flanges forming the rim of the same, and coöperating grooves formed in said members separate from the flanges, with locking means coöperating with said grooves, the grooved portions and the locking means being bent to lock the parts together, substantially for the purposes set forth.

In testimony whereof I have signed this specification in the presence of two subscribing witnesses.

LAWRENCE ZAMBONI.

Witnesses:
H. G. OGDEN, Jr.,
M. LACHMAN.

---

Correction in Letters Patent No. 751,707.

It is hereby certified that Letters Patent No. 751,707, granted February 9, 1904, upon the application of Lawrence Zamboni, of New York, N. Y., for an improvement in "Pulleys or Wheels," was erroneously issued to said "Zamboni" as owner of said invention; whereas the said Letters Patent should have been issued to the *Pressed Metal Manufacturing Company*, a corporation of New Jersey, as owner of the entire interest in said invention, as shown by the assignments of record in this office; and that the said Letters Patent should be read with this correction therein that the same may conform to the record of the case in the Patent Office.

Signed and sealed this 15th day of March, A. D., 1904.

[SEAL.]

F. I. ALLEN,
*Commissioner of Patents.* of the wheel, with a locking-strip extending into said grooves, the grooved portions and the locking-strip being bent to lock the two wheel members together, substantially for the purposes set forth.

3. As a new article of manufacture a wheel formed of two members having coöperating flanges forming the periphery of the same, and opposed grooves in the body portions of said members between said flanges and the center of the wheel, with a locking-strip extending into said grooves, the grooved portions and the locking-strip being bent outwardly against the bases of the said flanges and flat against the body portions of the wheel to lock the members together, substantially for the purposes set forth.

4. As a new article of manufacture, a wheel formed of two members having outwardly-flaring flanges forming the rim of the same, and coöperating grooves formed in said members separate from the flanges, with locking means coöperating with said grooves, the grooved portions and the locking means being bent to lock the parts together, substantially for the purposes set forth.

In testimony whereof I have signed this specification in the presence of two subscribing witnesses.

LAWRENCE ZAMBONI.

Witnesses:
H. G. OGDEN, Jr.,
M. LACHMAN.

---

Correction in Letters Patent No. 751,707.

It is hereby certified that Letters Patent No. 751,707, granted February 9, 1904, upon the application of Lawrence Zamboni, of New York, N. Y., for an improvement in "Pulleys or Wheels," was erroneously issued to said "Zamboni" as owner of said invention; whereas the said Letters Patent should have been issued to the *Pressed Metal Manufacturing Company*, a corporation of New Jersey, as owner of the entire interest in said invention, as shown by the assignments of record in this office; and that the said Letters Patent should be read with this correction therein that the same may conform to the record of the case in the Patent Office.

Signed and sealed this 15th day of March, A. D., 1904.

[SEAL.]

F. I. ALLEN,
*Commissioner of Patents.*

It is hereby certified that Letters Patent No. 751,707, granted February 9, 1904, upon the application of Lawrence Zamboni, of New York, N. Y., for an improvement in "Pulleys or Wheels," was erroneously issued to said "Zamboni" as owner of said invention; whereas the said Letters Patent should have been issued to the *Pressed Metal Manufacturing Company*, a corporation of New Jersey, as owner of the entire interest in said invention, as shown by the assignments of record in this office; and that the said Letters Patent should be read with this correction therein that the same may conform to the record of the case in the Patent Office.

Signed and sealed this 15th day of March, A. D., 1904.

[SEAL.]

F. I. ALLEN,
*Commissioner of Patents.*